United States Patent
Zhang et al.

(10) Patent No.: US 8,811,048 B2
(45) Date of Patent: Aug. 19, 2014

(54) MEDIUM VOLTAGE VARIABLE FREQUENCY DRIVING SYSTEM

(75) Inventors: Yi Zhang, Shanghai (CN); Wei Chen, Shanghai (CN); Bo-Yu Pu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 369 days.

(21) Appl. No.: 13/293,757

(22) Filed: Nov. 10, 2011

(65) Prior Publication Data

US 2013/0063070 A1 Mar. 14, 2013

(30) Foreign Application Priority Data

Sep. 13, 2011 (CN) .......................... 2011 1 0269272

(51) Int. Cl.
*H02P 27/14* (2006.01)
*H02P 23/04* (2006.01)

(52) U.S. Cl.
CPC ..................................... *H02P 27/14* (2013.01)
USPC .............................................. 363/37; 363/45

(58) Field of Classification Search
CPC ........... H02M 7/00; H02M 7/06; H02M 7/10; H02M 7/103; H02M 7/42; H02M 7/79; H02M 1/12; H02M 1/14; H02M 1/42; H02M 1/4208; H02M 1/4216; H02P 27/14; H02P 23/04
USPC .................. 363/34, 35, 37, 40, 41, 45, 67, 98
See application file for complete search history.

(56) References Cited

U.S. PATENT DOCUMENTS

| | | | |
|---|---|---|---|
| 5,355,297 A | 10/1994 | Kawabata et al. | |
| 5,644,483 A * | 7/1997 | Peng et al. | 363/37 |
| 5,910,892 A | 6/1999 | Lyons et al. | |
| 6,031,738 A * | 2/2000 | Lipo et al. | 363/37 |
| 6,369,543 B1 | 4/2002 | Masselus et al. | 318/700 |
| 6,385,057 B1 * | 5/2002 | Barron | 363/17 |
| 6,742,630 B2 * | 6/2004 | Eilinger | 187/290 |
| 7,031,172 B2 * | 4/2006 | Tanaka et al. | 363/56.03 |
| 8,174,225 B2 * | 5/2012 | Mazumdar et al. | 318/434 |
| 2009/0237962 A1 * | 9/2009 | Yun | 363/37 |

FOREIGN PATENT DOCUMENTS

| | | |
|---|---|---|
| CN | 101013818 A | 8/2007 |
| EP | 0802617 A2 | 10/1997 |
| EP | 2323249 A1 | 5/2011 |

* cited by examiner

*Primary Examiner* — Bentsu Ro
(74) *Attorney, Agent, or Firm* — CKC & Partners Co., Ltd.

(57) ABSTRACT

The present invention provides a medium voltage variable frequency driving system, including a three-phase switch-mode rectification module, a multilevel inverter and a high-capacity capacitor module. The three-phase switch-mode rectification module is coupled with a three-phase electrical grid, for converting an AC voltage input with a fixed operating frequency on the three-phase electrical grid into a DC voltage. The multilevel inverter is used for converting the DC voltage into an AC voltage with a required variable frequency, so as to drive an induction motor. The high-capacity capacitor module is coupled between the three-phase switch-mode rectification module and the multilevel inverter, for temporarily storing the DC voltage. In the present invention, a three-phase switch-mode rectification technology is used at the front-end rectifier, and a diode-clamped three-level inverter is adapted correspondingly at the rear-end inverter.

19 Claims, 8 Drawing Sheets

MEDIUM VOLTAGE VARIABLE FREQUENCY DRIVING SYSTEM

RELATED APPLICATIONS

This application claims priority to Chinese Application Serial Number 201110269272.8, filed Sep. 13, 2011, which is herein incorporated by reference.

BACKGROUND

1. Field of Invention

The present invention relates to a variable frequency drive system. More particularly, the present invention relates to a three-phase medium voltage variable frequency driving system.

2. Description of Related Art

In the controlling of a motor machine or an induction motor, it is an important issue to adjust the motor speed. The traditional direct current (DC) speed regulating technology adopted in a conventional motor machine has limited applications due to big volume and high failure rate of hardware.

A variable-frequency drive (VFD) is an electric drive element using the variable-frequency technology and the electronic technology to control an alternating current (AC) motor by changing the frequency and amplitude of a motor operation power supply.

The VFD is used for changing the AC power supply frequency and the amplitude of the induction motor, so as to change its motional magnetic field period, thereby achieving the aim of controlling the rotation rate of the induction motor smoothly. The emergence of VFD simplifies the complex speed-regulating control. The combination of the VFD and the AC induction motor replaces most tasks that originally can only be completed by using a DC motor, so that the volume of a circuit system is decreased and the maintenance ratio is reduced.

Currently, the medium-voltage variable frequency speed-regulating system is applied widely and has broad prospects in aspects such as a large-scale wind generator, a pump, drafting and gearing. The medium-voltage variable frequency speed-regulating system needs to have the following main functions: safety, fast speed, frequency control at a wide range; a good power factor at the electrical grid side; good input and output current harmonic waves and the like.

Figure 1:
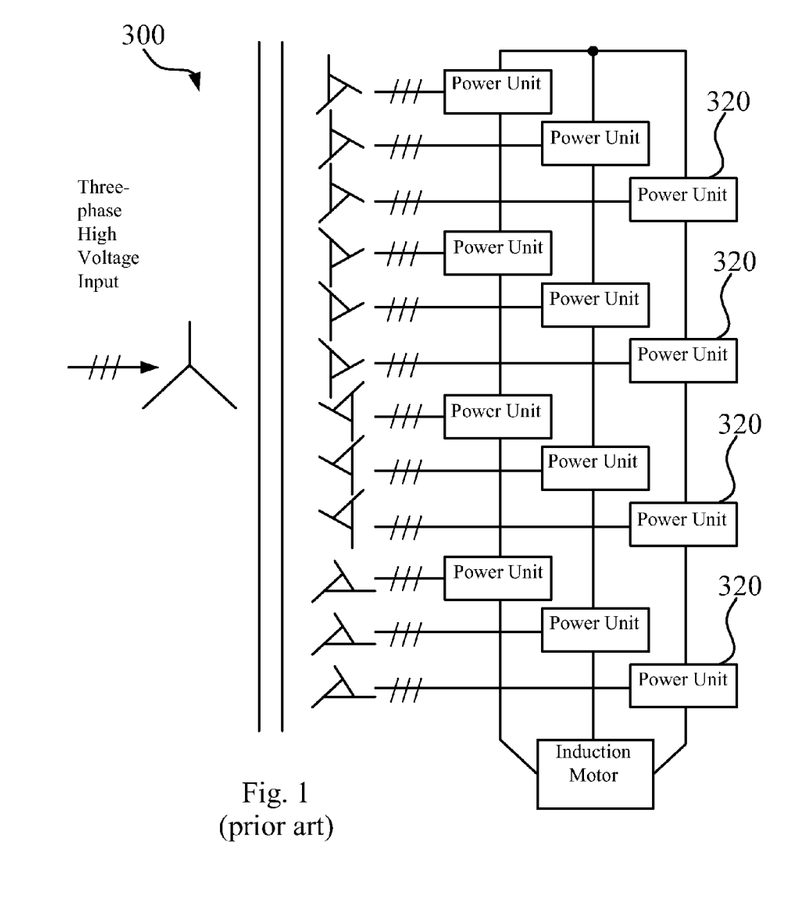
FIG. 1 illustrates a schematic view of a medium-voltage variable frequency speed-regulating system adopting a multilevel architecture in the prior art.
Figure 2:
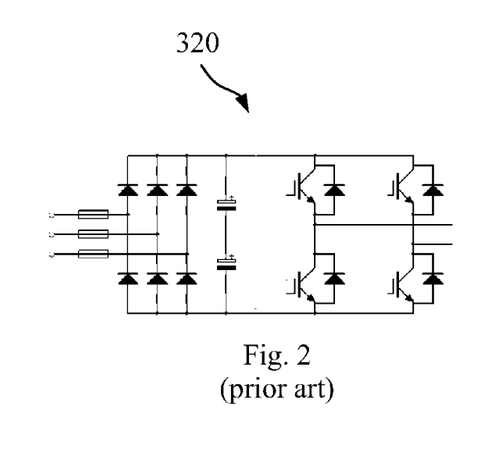
FIG. 2 illustrates a schematic interior circuit diagram of the power unit of a conventional medium-voltage variable frequency speed-regulating system in FIG. 1.

Meanwhile, due to the high requirements on the withstand voltage of a switch element in a medium-voltage (referring to a voltage between 1 kV-35 kV, such as 6 kV in a common application) system, the current most-common medium-voltage variable frequency speed-regulating system mostly use a multilevel cascade scheme. Referring to FIGS. 1 and 2, FIG. 1 illustrates a schematic view of a medium-voltage variable frequency speed-regulating system 300 adopting a multilevel architecture in the prior art, and FIG. 2 illustrates a schematic interior circuit diagram of the power unit 320 of the conventional medium-voltage variable frequency speed-regulating system 300 in FIG. 1. As shown in FIG. 1, in the medium-voltage variable frequency speed-regulating system 300, a multistage transformer can transform the high voltage at the electrical grid side into a plurality of secondary low voltages. Each secondary winding is connected with a separate power unit 320. As shown in FIG. 2, each power unit 320 completes the change from rectification to inversion, so as to implement a variable frequency speed-regulating function. The transformer is incorporated not only to solve issues regarding the withstand voltage of power devices, but also to solve issues about current harmonic waves at the electrical grid side. Taking the multistage transformer as an example, the multistage transformer can transform a high input voltage of the three-phase electrical grid (at the primary side) into a low operation voltage at the secondary side. Each winding at the secondary side is respectively coupled with a separate power unit. Each power unit completes the change from rectification to inversion for a low operation voltage, so as to implement a variable frequency speed-regulating function. Through the arrangement of the above mentioned multistage transformer, the issue that the power unit cannot withstand high voltage is solved, and the issue about current harmonic waves at the primary side is also solved. However, the multistage transformer arranged in the above mentioned conventional medium-voltage variable frequency speed-regulating system is of large volume and high weight, which leads to high cost and complex design. Thus, it is an important researching issue regarding how to use other speed-regulating system structures to omit the arrangement of the transformer while achieving the same performance.

Figure 3:
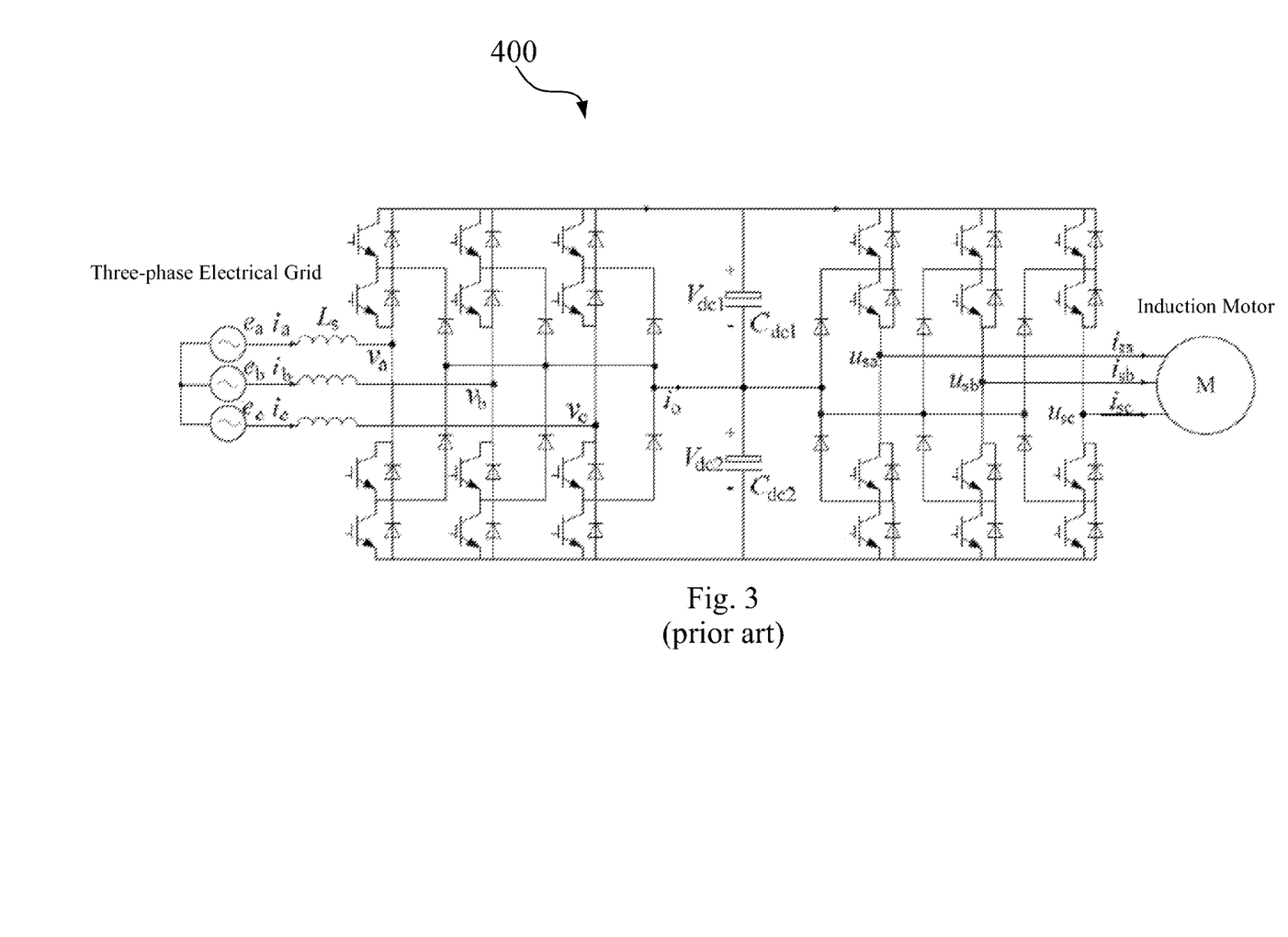
FIG. 3 illustrates a structure of a conventional medium-voltage variable frequency speed-regulating system.

FIG. 3 illustrates a structure of a conventional medium-voltage variable frequency speed-regulating system 400. The structure illustrated in FIG. 3 is a structure of the so-called back-to-back variable frequency speed-regulating system in the industry, which is an important structure of the medium-voltage speed-regulating system without a transformer. This back-to-back variable frequency speed-regulating structure 400 of the medium-voltage variable frequency speed-regulating system is based on a diode-clamping three-level topology. The multilevel design decreases the withstand voltage of a switching tube by a half. The structure of the rectification side is symmetrical with that of the inversion side, which can effectively control the power factor and harmonic waves at the electrical grid side and adjust the four-quadrant operation of the motor, so as to realize energy feedback. This energy feedback characteristic has significant meaning for applications of loads such as a lifter.

However, the above mentioned conventional medium-voltage variable frequency speed-regulating system without a transformer is still provided with a large number of switch elements, and the system has a relatively complex structure and still high cost.

SUMMARY

Accordingly, in order to solve the above mentioned problems, the present invention discloses a medium voltage variable frequency driving system. In the system, a three-phase switch-mode Vienna rectification technology is used at a front-end rectifier, and a diode-clamped three-level inverter is adapted correspondingly at a rear-end inverter, so as to realize a complete medium-voltage variable frequency speed-regulating system jointly. This variable frequency speed-regulating structure is based on a diode-clamping three-level topology. In the structure, the withstand voltage of the switch element complies with a back-to-back variable-frequency structure, and the number of the switch elements is decreased significantly. For loads, such as a wind generator, a pump or the like, which require no energy feedback, a single-quadrant structure may be used at the cost of the energy feedback function, thereby decreasing the number of the switch elements and reducing the cost.

Compared with a conventional three-level pulse-width modulation (PWM) rectifier, in the circuit structure of the three-phase Vienna rectification module provided by the embodiments of the present invention, the number of the switch elements may be decreased by at least a half by replacing some switch elements with power diodes. In the circuit structure of the three-phase Vienna rectification module provided by the present invention, some diodes do not need to commutate with the switch elements at a high switching frequency (such as about 1200 Hz), so that requirements on the backward recovery characteristic of the diode are lowered significantly, and the cost is further reduced. Furthermore, in the three-phase switch-mode rectification module provided by some embodiments of the present invention, since the existence of a commutating diode limits the current direction, even if two switch elements in the same phase are turned on or off simultaneously, a shoot-through situation does not happen, i.e. no influence is caused to the normal operation of effective switch elements; and the three-phase switch-mode rectification module is simple and reliable to control.

According to an aspect of the present invention, a medium voltage variable frequency driving system coupled with a three-phase electrical grid for driving an induction motor is provided. The medium voltage variable frequency driving system includes a three-phase switch-mode rectification module, a multilevel inverter and a high-capacity capacitor module. The three-phase switch-mode rectification module is coupled with the three-phase electrical grid for converting an alternating current (AC) voltage input with a fixed operating frequency on the three-phase electrical grid into a direct current (DC) voltage. The multilevel inverter is used for converting the DC voltage into an AC voltage with a required variable frequency, and the AC voltage is used for driving the induction motor. The high-capacity capacitor module is coupled between the three-phase switch-mode rectification module and the multilevel inverter, for temporarily storing the DC voltage.

According to an embodiment of the present invention, the three-phase switch-mode rectification module includes three single-phase rectification circuits. The three single-phase rectification circuits are coupled in parallel with each other and form a three-level rectification circuit. Each of the three single-phase rectification circuits respectively receives a single-phase voltage input from the three-phase electrical grid. All of the three single-phase rectification circuits are coupled to a first output terminal, a midpoint and a second output terminal. The three-phase switch-mode rectification module is used for adjusting a power factor of the three-phase electrical grid and eliminating total current harmonic distortion of the three-phase electrical grid.

According to an embodiment of the present invention, an inductance is respectively coupled between a voltage input terminal of the three single-phase rectification circuits and the three-phase electrical grid.

According to an embodiment of the present invention, each of the three single-phase rectification circuits includes at least two diodes. One diode is a commutating diode for ensuring the unidirectivity of the current, and the other diode is a non-commutating diode, such as a slow-recovery diode.

According to an embodiment of the present invention, in the three single-phase rectification circuits, the commutating diode operates at a switching frequency and needs to use a fast-recovery diode.

According to an embodiment of the present invention, the three-phase switch-mode rectification module is a three-phase Vienna rectification module.

According to an embodiment of the present invention, in the multilevel inverter, by coupling the first output terminal, the midpoint and the second output terminal with the high-capacity capacitor module, the input from the three-phase electrical grid is converted into a required three-phase AC output through the multilevel inverter, so as to drive the induction motor.

According to an embodiment of the present invention, the multilevel inverter is a three-level inverter, and each single-phase three-level inverter at least includes two switches and a clamping diode. One terminal of the clamping diode is coupled with the midpoint, and the other terminal of the clamping diode is coupled with the two switch elements.

According to an embodiment of the present invention, the AC voltage is a PWM square-wave AC signal. The medium voltage variable frequency driving system further includes at least one controller coupled with the multilevel inverter and the three-phase switch-mode rectification module, for controlling the AC voltage. In this embodiment, the AC voltage may be a PWM square-wave AC signal. The controller is used for controlling the variable frequency, a pulse width or an amplitude of the PWM square-wave AC signal, so that the controller is used for superimposing the PWM square-wave AC signal into an AC output similar to a sinusoidal wave, thereby driving the induction motor.

According to an embodiment of the present invention, the controller of the medium voltage variable frequency driving system is used for controlling the variable frequency, the pulse width or the amplitude of the PWM square-wave AC signal at the AC side of the rectification module, to allow controlling of the power factor and the total harmonic distortion of the three-phase switch-mode rectification module, so as to respectively achieve an appropriate value of the power factor and the total harmonic distortion.

According to an embodiment of the present invention, the controller of the medium voltage variable frequency driving system is a digital microprocessor.

According to an embodiment of the present invention, each of the three single-phase rectification circuits respectively includes a first diode, a second diode, a third diode, a fourth diode, a first switch and a second switch. The anode of the first diode is coupled to the single-phase voltage input. The anode of the second diode is coupled to the cathode of the first diode, and the cathode of the second diode is coupled to the first output terminal. The cathode of the third diode is coupled to the single-phase voltage input. The cathode of the fourth diode is coupled to the anode of the third diode, and the anode of the fourth diode is coupled to the second output terminal. A first terminal of the first switch is coupled between the first diode and the second diode, and a second terminal of the first switch is coupled to the midpoint. A first terminal of the second switch is coupled to the midpoint, and a second terminal of the second switch is coupled between the third diode and the fourth diode.

In the above mentioned embodiment, the second and fourth diodes are commutating diodes and adopt fast-recovery diodes. The first and third diodes are non-commutating diodes and adopt slow-recovery or fast-recovery diodes.

According to another embodiment of the present invention, each of the three single-phase rectification circuits respectively includes a first diode, a second diode, a third diode, a fourth diode, a first switch and a second switch. The anode of the first diode is coupled to the single-phase voltage input, and the cathode of the first diode is coupled to the first output terminal. The anode of the second diode is coupled to the single-phase voltage input. The cathode of the third diode is coupled to the single-phase voltage input, and the anode of the third diode is coupled to the second output terminal. The cathode of the fourth diode is coupled to the single-phase voltage input. A first terminal of the first switch is coupled to the cathode of the second diode, and a second terminal of the first switch is coupled to the midpoint. A first terminal of the second switch is coupled to the midpoint, and a second terminal of the second switch is coupled to the anode of the fourth diode.

In the above mentioned embodiment, the first and third diodes are commutating diodes and adopt fast-recovery diodes. The second and fourth diodes are non-commutating diodes and adopt slow-recovery or fast-recovery diodes.

According to a further embodiment of the present invention, each of the three single-phase rectification circuits respectively includes a first diode, a second diode, a third diode, a fourth diode, a fifth diode, a sixth diode and a switch. The anode of the first diode is coupled to the single-phase voltage input. The anode of the second diode is coupled to the midpoint. The cathode of the third diode is coupled to the first output terminal. The cathode of the fourth diode is coupled to the single-phase voltage input. The cathode of the fifth diode is coupled to the midpoint. The anode of the sixth diode is coupled to the second output terminal. A first terminal of the switch is coupled between the cathode of the first diode, the cathode of the second diode and the anode of the third diode, and a second terminal of the switch is coupled between the anode of the fourth diode, the anode of the fifth diode and the cathode of the sixth diode.

In the above mentioned embodiment, the third and sixth diodes are commutating diodes and adopt fast-recovery diodes. The first, second, fourth and fifth diodes are non-commutating diodes and adopt slow-recovery or fast-recovery diodes.

According to another embodiment of the present invention, each of the three single-phase rectification circuits respectively includes a first diode, a second diode, a third diode, a fourth diode, a first switch and a second switch. A second terminal of the first switch is coupled to the single-phase voltage input. A first terminal of the second switch is coupled to the single-phase voltage input. The anode of the first diode is coupled to a first terminal of the first switch, and the cathode of the first diode is coupled to the first output terminal. The anode of the second diode is coupled to the midpoint, and the cathode of the second diode is coupled to the first terminal of the first switch. The cathode of the third diode is coupled to a second terminal of the second switch, and the anode of the third diode is coupled to the second output terminal. The anode of the fourth diode is coupled to the second terminal of the second switch, and the cathode of the fourth diode is coupled to the midpoint.

In the above mentioned embodiment, the first and third diodes are commutating diodes and adopt fast-recovery diodes. The second and fourth diodes are non-commutating diodes and adopt slow-recovery or fast-recovery diodes.

BRIEF DESCRIPTION OF THE DRAWINGS

After reading specific embodiments of the present invention with reference to the accompanying drawings, readers can understand various aspects of the present invention more clearly. In the drawings.

DETAILED DESCRIPTION

Figure 4:
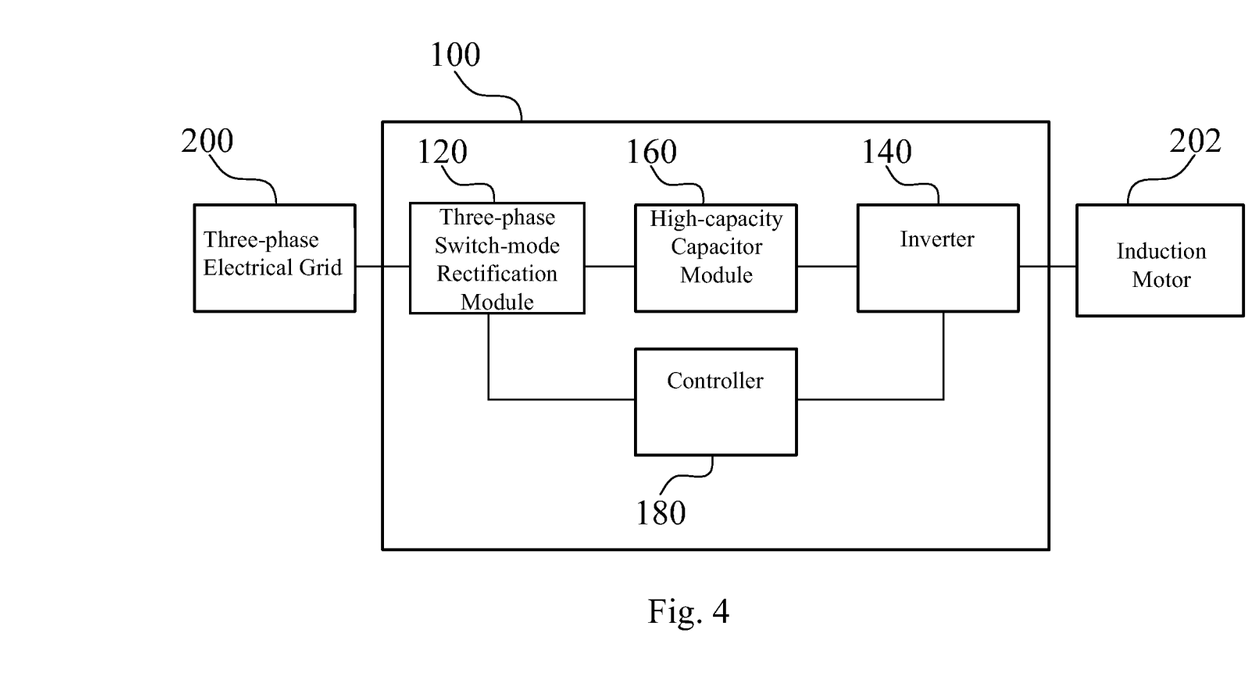
FIG. 4 illustrates a schematic functional block diagram of a medium voltage variable frequency driving system according to an embodiment of the present invention.
Figure 5:
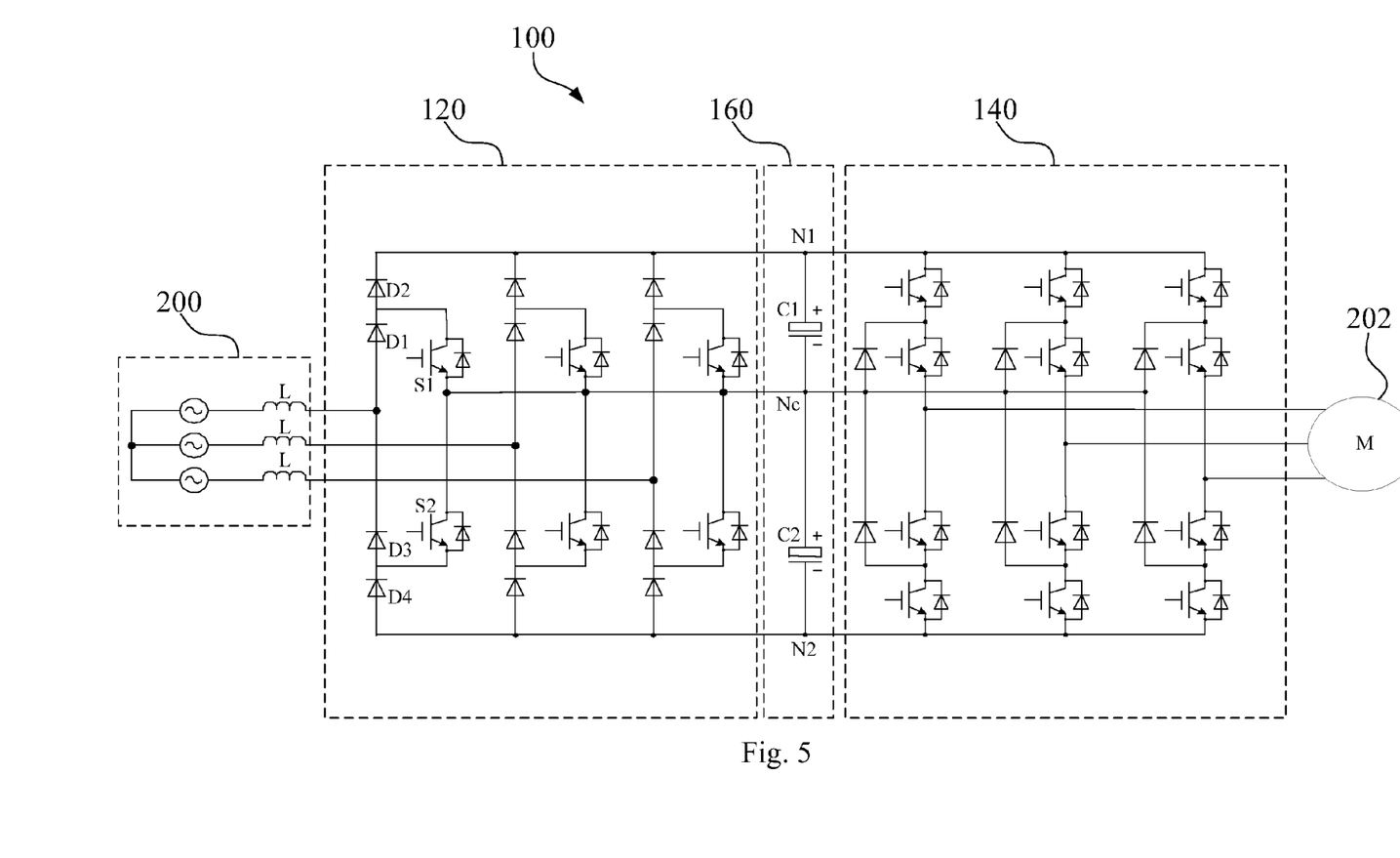
FIG. 5 illustrates a schematic circuit diagram of the three-phase switch-mode rectification module, the multilevel inverter and the high-capacity capacitor module in the medium voltage variable frequency driving system of FIG. 4.

Referring to FIG. 4, FIG. 4 illustrates a schematic functional block diagram of a medium voltage variable frequency driving system 100 according to an embodiment of the present invention. In this embodiment, the medium voltage variable frequency driving system 100 is coupled with a three-phase electrical grid 200, for driving an induction motor 202. As shown in FIG. 4, the medium voltage variable frequency driving system 100 includes a three-phase switch-mode rectification module 120, a multilevel inverter 140 and a high-capacity capacitor module 160. Referring to FIG. 5 at the same time, FIG. 5 illustrates a schematic circuit diagram of the three-phase switch-mode rectification module 120, the multilevel inverter 140 and the high-capacity capacitor module 160 in the medium voltage variable frequency driving system 100 of FIG. 4.

As shown in FIGS. 4 and 5, the three-phase switch-mode rectification module 120 is coupled with the three-phase electrical grid 200, for converting an AC input with a fixed operating frequency on the three-phase electrical grid 200 into a DC signal. The multilevel inverter 140 is used for converting the DC signal into a variable-frequency square-wave signal for driving the induction motor 202. The high-capacity capacitor module 160 is coupled between the three-phase switch-mode rectification module 120 and the multilevel inverter 140, for temporarily storing the DC signal. The three-phase switch-mode rectification module 120 is used for adjusting the power factor of the three-phase electrical grid 200 and eliminating the total current harmonic distortion of the three-phase electrical grid.

In this embodiment of the invention, the multilevel inverter 140 is a three-level inverter, and each single-phase three-level inverter at least includes two switch elements and a clamping diode. The two switch elements and the clamping diode may be arranged on the bridge arm of the single-phase three-level inverter. One terminal of the clamping diode is coupled with the midpoint, and the other terminal is coupled with the two switch elements.

Furthermore, as shown in FIG. 4, in some embodiments of the invention, the medium voltage variable frequency driving system 100 may further includes a controller 180. The controller 180 may be coupled with the multilevel inverter 140 and the three-phase switch-mode rectification module 120, and the controller 180 is used for controlling the variable frequency, a pulse width or an amplitude of the AC voltage.

In this embodiment of the invention, the AC voltage is a PWM square-wave AC signal.

The controller 180 is used for controlling the variable frequency, the pulse width or the amplitude of the PWM square-wave AC signal. As such, the controller 180 is used for superimposing the PWM square-wave AC signal into an AC output similar to a sinusoidal wave, thereby driving the induction motor 202. The controller 180 is used for controlling the variable frequency, the pulse width or the amplitude of the PWM square-wave AC signal. As such, the controller 180 is used for superimposing the PWM square-wave AC signal into an AC output similar to a sinusoidal wave, thereby controlling the power factor and the total current harmonic distortion at the electrical grid side.

In practical applications, the controller is used for controlling the variable frequency, the pulse width or the amplitude of the PWM square-wave AC signal at the AC side of the rectification module, to allow controlling of the power factor and the total harmonic distortion of the three-phase switch-mode rectification module, so as to respectively achieve an appropriate value of the power factor and the total harmonic distortion. In practical applications, the controller in the medium voltage variable frequency driving system 100 may be but not limited to a digital microprocessor; and other appropriate processors may also be used by those of skills in the art.

In this embodiment of the invention, the three-phase switch-mode rectification module 120 mentioned in the present invention may use a structure of a three-phase Vienna rectification module itself. The interior structure of the three-phase switch-mode rectification module 120 provided by the present invention will be further illustrated in the following paragraphs.

Figure 6:
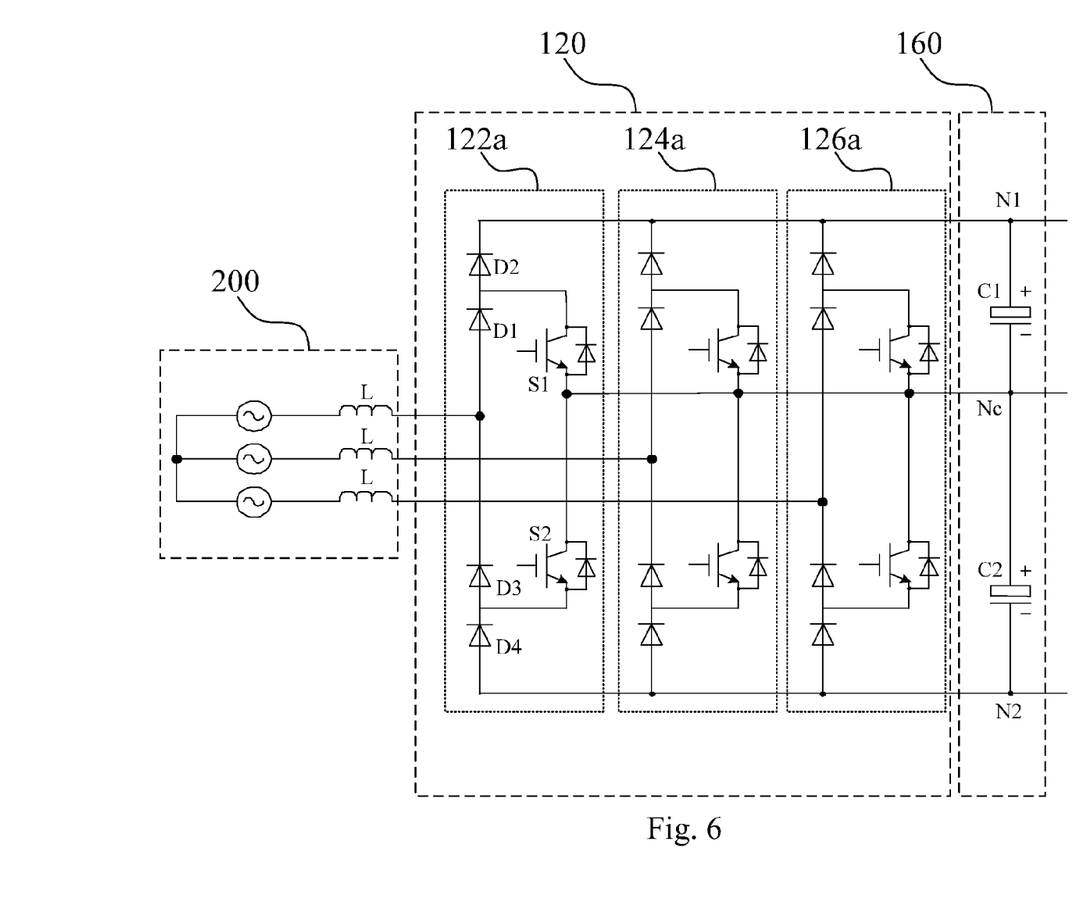
FIG. 6 illustrates a schematic partial view of the three-phase switch-mode rectification module and the peripheral circuits in the medium voltage variable frequency driving system.

Further referring to FIG. 6, FIG. 6 illustrates a schematic partial view of the three-phase switch-mode rectification module 120 and the peripheral circuits in the medium voltage variable frequency driving system 100.

As shown in FIG. 6, the three-phase switch-mode rectification module 120 includes three single-phase rectification circuits (a single-phase rectification circuit 122a, a single-phase rectification circuit 124a and a single-phase rectification circuit 126a). The three single-phase rectification circuits 122a-126a coupled in parallel with each other respectively receive a set of single-phase voltage input from the three-phase electrical grid 200. The three single-phase rectification circuits 122a-126a are all coupled to a first output terminal N1, a midpoint Nc and a second output terminal N2 (as shown in FIG. 6).

Moreover, in this embodiment of the invention, the high-capacity capacitor module 160 may includes a first capacitor C1 and a second capacitor C2. The first capacitor C1 is coupled between the first output terminal N1 and the midpoint Nc. The second capacitor C2 is coupled between the midpoint Nc and the second output terminal N2.

Since the three single-phase rectification circuits 122a-126a in the three-phase switch-mode rectification module 120 all have similar structures, for purpose of simple illustration, the single-phase rectification circuit 122a is taken as an example. Since the other single-phase rectification circuits 124a and 126a have corresponding structures, no further description will be given here.

As shown in FIG. 6, according to an embodiment of the present invention, the single-phase rectification circuit set 122a includes a first diode D1, a second diode D2, a third diode D3, a fourth diode D4, a first switch S1 and a second switch S2. The anode of the first diode D1 is coupled to the single-phase voltage input. The anode of the second diode D2 is coupled to the cathode of the first diode D1, and the cathode of the second diode D2 is coupled to the first output terminal N1. The cathode of the third diode D3 is coupled to the single-phase voltage input. The cathode of the fourth diode D4 is coupled to the anode of the third diode D3, and the anode of the fourth diode D4 is coupled to the second output terminal N2. One terminal of the first switch S1 is coupled between the first diode D1 and the second diode D2, and the other terminal of the first switch S1 is coupled to the midpoint Nc. One terminal of the second switch S2 is coupled to the midpoint Nc, and the other terminal of the second switch S2 is coupled between the third diode D3 and the fourth diode D4.

In this embodiment of the invention, the first diode D1 and the third diode D3 may operate at a low operation frequency (such as between about 50 HZ and 60 HZ). The second diode D2 and the fourth diode D4 operate at a high switching frequency (such as about 1200 Hz) together with the first switch S1 and the second switch S2. In this embodiment, the second diode D2 and the fourth diode D4 are commutating diodes and need to use diode elements with a fast-recovery characteristic and a high slew rate.

It should be added that, the commutating diode mentioned in the present invention refers to a diode, into which the load current completely transfers and flows after the switch element is turned off at a switching frequency, i.e. a commutating diode. On the other hand, after the switch element is turned off, if the load current does not completely transfer or flow into a diode, then the diode is a non-commutating diode.

In this embodiment of the invention, the second diode D2 and the fourth diode D4 are commutating diodes and need to use diode elements with a fast-recovery characteristic. On the other hand, the first diode D1 and the third diode D3 are non-commutating diodes and may adopt diode elements with a fast-recovery or slow-recovery characteristic.

That is, each set of single-phase rectification circuit 122a, 124a or 126a includes at least two diodes. The two diodes may be arranged on the bridge arm of each set of single-phase rectification circuit. One diode is a commutating diode for ensuring the unidirectivity of the current, and the other diode is a non-commutating diode. In the three single-phase rectification circuits, the commutating diode operates at a switching frequency and adopts a fast-recovery diode.

In order to understand the operation manner of the three-phase switch-mode rectification module 120 (the single-phase rectification circuit 122a, the single-phase rectification circuit 124a and the single-phase rectification circuit 126a) provided by the present invention, an equivalent single-phase circuit of the single-phase rectification circuit 122a is used for illustration in the following paragraphs.

Compared with a traditional three-level pulse-width modulation (PWM) rectifier, in the interior circuit structure of the three-phase switch-mode rectification module 120, i.e., the three single-phase rectification circuits 122a-126a provided by the present invention, the number of the switch elements may be decreased by at least a half by replacing some switch elements with diodes.

Furthermore, in the three-phase switch-mode rectification module 120 provided by this embodiment, since the commutating diodes in the single-phase rectification circuits 122a-126a limit the current direction, even if two switch elements (such as switches S1 and S2) in the same phase circuit are turned on or off simultaneously, a shoot-through situation does not happen, i.e. no influence is caused to the normal operation of other elements. The three-phase switch-mode rectification module 120 is simple and reliable to control.

The variable frequency speed-regulating structure is based on a diode-clamping three-level topology. The multilevel design can reduce the withstand voltage by a half; and the three-phase switch-mode rectification module decreased the number of the switch elements by at least a half. For loads, such as a wind generator, a pump or the like, which require no energy feedback, a single-quadrant structure may be used at the cost of the energy feedback function, thereby decreasing the number of the switch elements and reducing the cost.

The three-phase switch-mode rectification module 120 provided by the present invention is not limited to the architecture of the single-phase rectification circuits 122a-126a in the above mentioned embodiments and FIG. 6. Various interior circuit architectures of the three-phase switch-mode rectification module 120 are additionally provided by the present invention to achieve similar effects.

Figure 7:
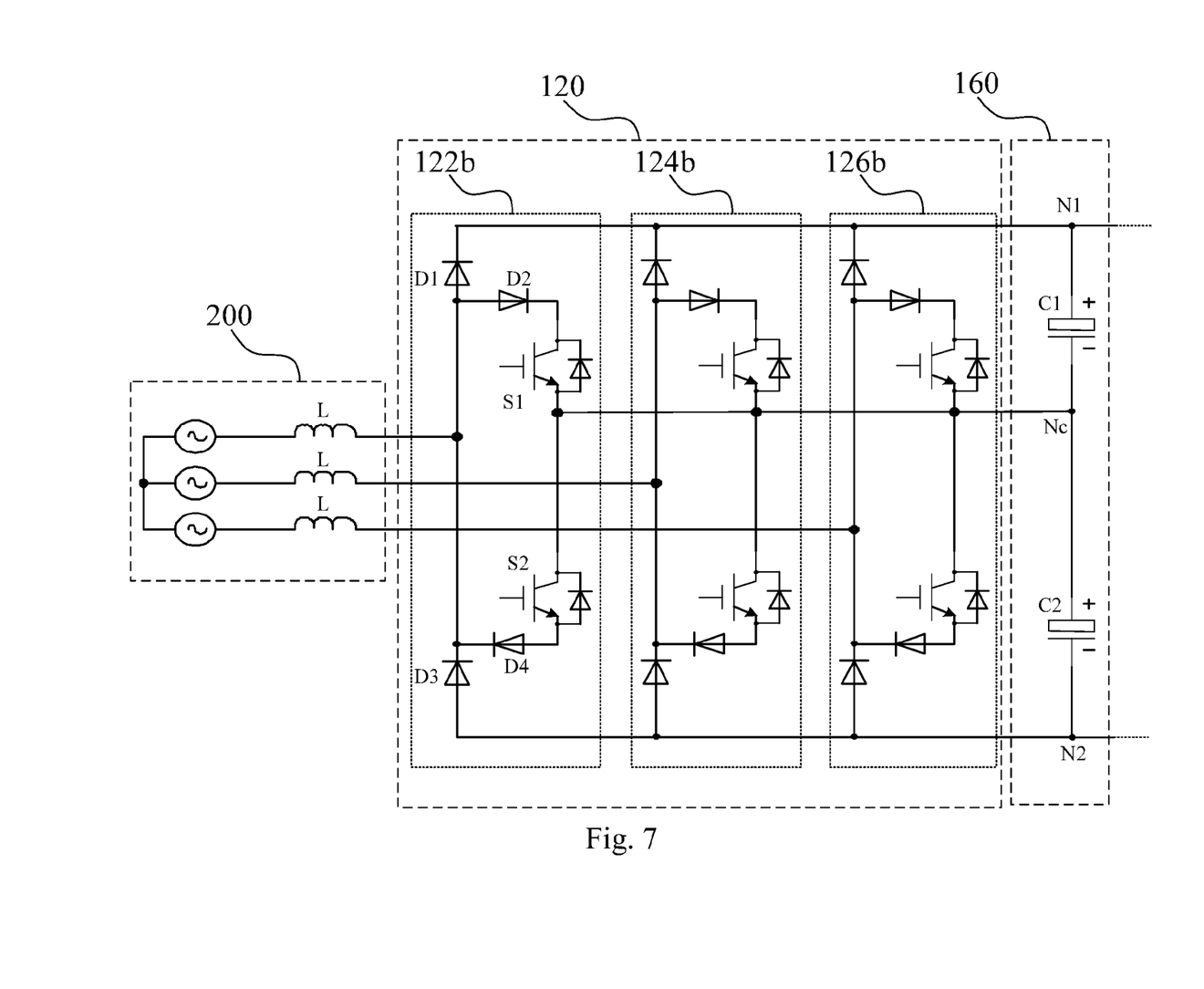
FIG. 7 illustrates a schematic partial view of the single-phase rectification circuits in the three-phase switch-mode rectification module and the peripheral circuits of another embodiment.

Referring to FIG. 7, FIG. 7 illustrates a schematic partial view of the single-phase rectification circuits 122b-126b in the three-phase switch-mode rectification module 120 and the peripheral circuits of another embodiment of the invention.

As shown in FIG. 7, in the three-phase switch-mode rectification module 120 provided by another embodiment of the present invention, each of the single-phase rectification circuits 122b-126b is different from the single-phase rectification circuits 122a-126a in the previous embodiment of the invention.

Since the three single-phase rectification circuits 122b-126b in the three-phase switch-mode rectification module 120 all have similar structures, for purpose of simple illustration, the single-phase rectification circuit 122b is taken as an example.

As shown in FIG. 7, the single-phase rectification circuit 122b includes the first diode D1, the second diode D2, the third diode D3, the fourth diode D4, the first switch S1 and the second switch S2. The anode of the first diode D1 is coupled to the single-phase voltage input, and the cathode of the first diode D1 is coupled to the first output terminal N1. The anode of the second diode D2 is coupled to the single-phase voltage input. The cathode of the third diode D3 is coupled to the single-phase voltage input, and the anode of the third diode D3 is coupled to the second output terminal N2. The cathode of the fourth diode D4 is coupled to the single-phase voltage input. One terminal of the first switch S1 is coupled to the cathode of the second diode D2, and the other terminal of the first switch S1 is coupled to the midpoint Nc. One terminal of the second switch S2 is coupled to the midpoint Nc, and the other terminal of the second switch S2 is coupled to the anode of the fourth diode D4.

In this embodiment of the invention, the first diode D1, the second diode D2, the third diode D3 and the fourth diode D4 may operate at the same switching frequency (such as about 1200 HZ) with the first switch S1 and the second switch S2. In this embodiment, the first diode D1 and the third diode D3 are both commutating diodes and need to use diode elements with a fast-recovery characteristic and a high slew rate. However, the second diode D2 and the fourth diode D4 do not need this fast-recovery characteristic.

Figure 8:
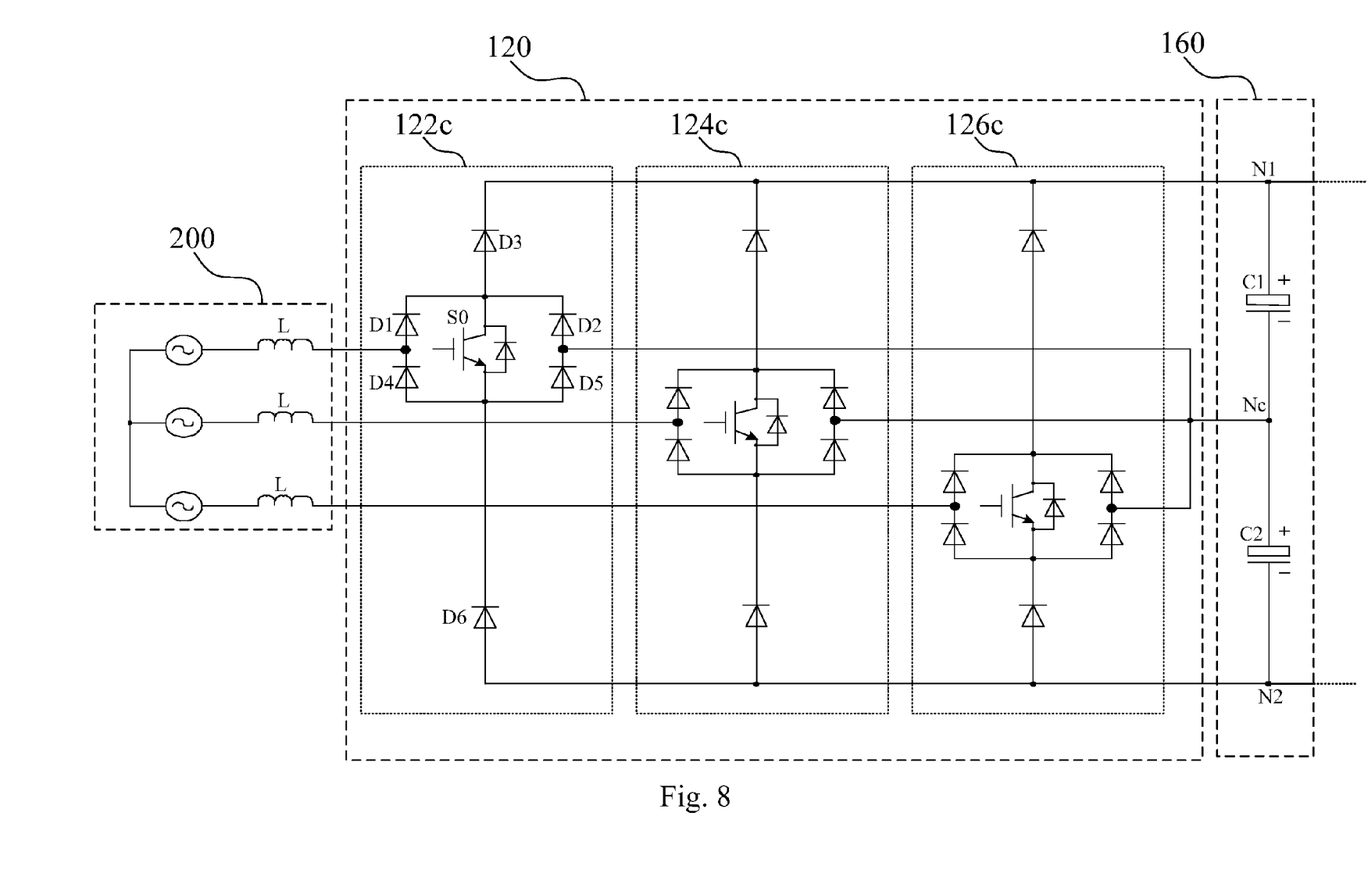
FIG. 8 illustrates a schematic partial view of the single-phase rectification circuits in the three-phase switch-mode rectification module and the peripheral circuits of another embodiment.

Referring to FIG. 8, FIG. 8 illustrates a schematic partial view of the single-phase rectification circuits 122c-126c in the three-phase switch-mode rectification module 120 and the peripheral circuits of another embodiment of the invention.

As shown in FIG. 8, since the three single-phase rectification circuits 122c-126c in the three-phase switch-mode rectification module 120 all have similar structures, for purpose of simple illustration, the single-phase rectification circuit 122c is taken as an example.

As shown in FIG. 8, the single-phase rectification circuit 122c includes the first diode D1, the second diode D2, the third diode D3, the fourth diode D4, a fifth diode D5, a sixth diode D6 and a switch S0. The anode of the first diode D1 is coupled to the single-phase voltage input. The anode of the second diode D2 is coupled to the midpoint Nc. The cathode of the third diode D3 is coupled to the first output terminal N1. The cathode of the fourth diode D4 is coupled to the single-phase voltage input. The cathode of the fifth diode D5 is coupled to the midpoint Nc. The anode of the sixth diode D6 is coupled to the second output terminal N2. One terminal of the switch S0 is coupled between the cathode of the first diode D1, the cathode of the second diode D2 and the anode of the third diode D3. The other terminal of the switch S0 is coupled between the anode of the fourth diode D4, the anode of the fifth diode D5 and the cathode of the sixth diode D6.

In this embodiment of the invention, the first diode D1 and the fourth diode D4 may operate at a low operation frequency. The first frequency is between about 50 HZ to 60 HZ. The second diode D2, the third diode D3, the fifth diode D5, the sixth diode D6 and the switch S0 operate at a switching frequency (such as about 1200 HZ). In this embodiment, the third diode D3 and the sixth diode D6 are both commutating diodes and need to use diode elements with a fast-recovery characteristic and a high slew rate. However, the first diode D1, the second diode D2, the fourth diode D4 and the fifth diode D5 do not need this fast-recovery characteristic.

If the single-phase rectification circuits 122c-126c of FIG. 8 are used in the three-phase switch-mode rectification module 120, the number of the switch elements may be further decreased (compared with the embodiments of FIGS. 6 and 7, this embodiment needs only a half number of switch elements). However, the number of the corresponding diodes is increased significantly.

Figure 9:
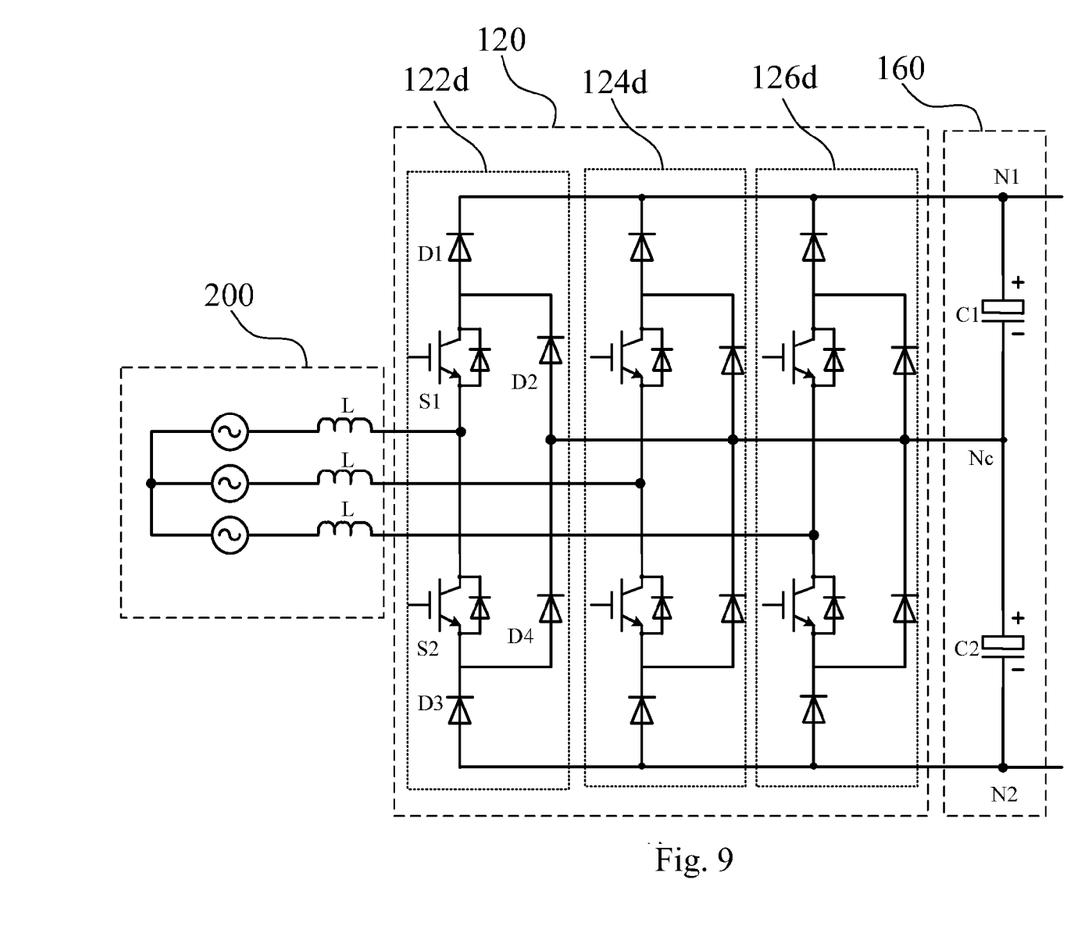
FIG. 9 illustrates a schematic partial view of the single-phase rectification circuit in the three-phase switch-mode rectification module and the peripheral circuits of a further embodiment.

Referring to FIG. 9, FIG. 9 illustrates a schematic partial view of the single-phase rectification circuits 122d-126d in the three-phase switch-mode rectification module 120 and the peripheral circuits of a further embodiment of the invention.

As shown in FIG. 9, since the three single-phase rectification circuits 122d-126d in the three-phase switch-mode rectification module 120 all have similar structures, for purpose of simple illustration, the single-phase rectification circuit 122d is taken as an example.

As shown in FIG. 9, the single-phase rectification circuit 122d includes the first diode D1, the second diode D2, the third diode D3, the fourth diode D4, the first switch S1 and the second switch S2. A second terminal of the first switch S1 is coupled to the single-phase voltage input. A first terminal of the second switch S2 is coupled to the single-phase voltage input. The anode of the first diode D1 is coupled to a first terminal of the first switch S1, and the cathode of the first diode D1 is coupled to the first output terminal N1. The anode of the second diode D2 is coupled to the midpoint Nc, and the cathode of the second diode D2 is coupled to the first terminal of the first switch S1. The cathode of the third diode D3 is coupled to the second terminal of the second switch S2, and the anode of the third diode D3 is coupled to the second output terminal N2. The anode of the fourth diode D4 is coupled to the second terminal of the second switch S2, and the cathode of the fourth diode D4 is coupled to the midpoint Nc.

The first diode D1 and the third diode D3 are commutating diodes and adopt fast-recovery diodes. The second diode D2 and the fourth diode D4 are non-commutating diodes and adopt slow-recovery or fast-recovery diodes.

In the above mentioned embodiment, the present invention provides a plurality of actual interior circuit architectures of the three-phase switch-mode rectification module 120 (as shown in FIGS. 6-9). All factors should be taken into consideration with reference to the practical process situation, the element characteristic, the cost and the like on the selection of specific path of the three-phase switch-mode (Vienna) rectification module mentioned above.

In sum, the present invention discloses a medium voltage variable frequency driving system and a three-phase switch-mode rectification module thereof. A three-phase switch-mode rectification technology, such as a three-phase Vienna rectification module, is adopted at the front-end rectifier, and a diode-clamped three-level inverter is adapted correspondingly at a rear-end inverter, so as to realize a complete medium-voltage variable frequency speed-regulating system jointly. Compared with a conventional three-level PWM rectifier, in the circuit structure of the three-phase Vienna rectification module provided by various embodiments of the present invention, the number of the switch elements may be decreased by at least a half by replacing some switch elements with power diodes. In the circuit structure of the three-phase Vienna rectification module provided by the present invention, some diodes do not need to commutate with the switch elements at a high switching frequency (such as about 1200 Hz), so that requirements on the backward recovery characteristic of the diode does not exist, and the cost is further reduced. Furthermore, in the three-phase switch-mode rectification module provided by some embodiments of the present invention, since the diode limits the current direction, even if two switch elements are turned on or off simultaneously, a shoot-through situation does not happen, i.e. no influence is caused to the normal operation of effective switch elements; and the three-phase switch-mode rectification module is simple and reliable to control.

In the foregoing, the specific embodiments of the present invention are described with reference to the accompanying drawings. However, those of ordinary skills in the art should understand that various modifications and variations can also be made to the specific embodiments of the present invention without departing from the spirit or scope of the present invention. These modifications and variations all fall in the scope defined by the claims of the present invention.

What is claimed is:

1. A medium voltage variable frequency driving system coupled with a three-phase electrical grid for driving an induction motor, the medium voltage variable frequency driving system comprising:
    a three-phase switch-mode rectification module coupled with the three-phase electrical grid for converting an alternating current voltage input with a fixed operating frequency on the three-phase electrical grid into a direct current voltage, wherein the three-phase switch-mode rectification module is a three-phase Vienna rectification module;
    a multilevel inverter for converting the direct current voltage into alternating current voltage with a required variable frequency, wherein the alternating current voltage is used for driving the induction motor; and
    a high-capacity capacitor module coupled between the three-phase switch-mode rectification module and the multilevel inverter, for temporarily storing the direct current voltage.

2. The medium voltage variable frequency driving system of claim 1, wherein the three-phase switch-mode rectification module comprises:
    three single-phase rectification circuits, wherein the three single-phase rectification circuits are coupled in parallel with each other and form a three-level rectification circuit, the three single-phase rectification circuits respectively receive a single-phase voltage input from the three-phase electrical grid, all of the three single-phase rectification circuits are coupled to a first output terminal, a midpoint and a second output terminal, and the three-phase switch-mode rectification module is used for adjusting a power factor of the three-phase electrical grid and eliminating total current harmonic distortion of the three-phase electrical grid.

3. The medium voltage variable frequency driving system of claim 2, wherein an inductance is coupled between a voltage input terminal of each of the three single-phase rectification circuits and the three-phase electrical grid respectively.

4. The medium voltage variable frequency driving system of claim 3, wherein each of the three single-phase rectification circuits comprises at least two diodes, wherein one diode is a commutating diode for ensuring the unidirectivity of the current, and the other diode is a non-commutating diode.

5. The medium voltage variable frequency driving system of claim 4, wherein, in the three single-phase rectification circuits, the commutating diode operates at a switching frequency, and the commutating diode adopts a fast-recovery diode.

6. The medium voltage variable frequency driving system of claim 4, wherein each of the three single-phase rectification circuits respectively comprises:
    a first diode, an anode of the first diode is coupled to the single-phase voltage input;
    a second diode, an anode of the second diode is coupled to a cathode of the first diode, and a cathode of the second diode is coupled to the first output terminal;
    a third diode, a cathode of the third diode is coupled to the single-phase voltage input;
    a fourth diode, a cathode of the fourth diode is coupled to an anode of the third diode, and an anode of the fourth diode is coupled to the second output terminal;
    a first switch, a first terminal of the first switch is coupled between the first diode and the second diode, and a second terminal of the first switch is coupled to the midpoint; and
    a second switch, a first terminal of the second switch is coupled to the midpoint, and a second terminal of the second switch is coupled between the third diode and the fourth diode.

7. The medium voltage variable frequency driving system of claim 6, wherein the second diode and the fourth diode are commutating diodes and adopt fast-recovery diodes, and the first diode and the third diode are non-commutating diodes and adopt slow-recovery or fast-recovery diodes.

8. The medium voltage variable frequency driving system of claim 4, wherein each of the three single-phase rectification circuits respectively comprises:
    a first diode, an anode of the first diode is coupled to the single-phase voltage input, and a cathode of the first diode is coupled to the first output terminal;
    a second diode, an anode of the second diode is coupled to the single-phase voltage input;
    a third diode, a cathode of the third diode is coupled to the single-phase voltage input, and an anode of the third diode is coupled to the second output terminal;
    a fourth diode, a cathode of the fourth diode is coupled to the single-phase voltage input;
    a first switch, a first terminal of the first switch is coupled to a cathode of the second diode, and a second terminal of the first switch is coupled to the midpoint; and
    a second switch, a first terminal of the second switch is coupled to the midpoint, and a second terminal of the second switch is coupled to an anode of the fourth diode.

9. The medium voltage variable frequency driving system of claim 8, wherein the first diode and the third diode are commutating diodes and adopt fast-recovery diodes, and the second diode and the fourth diode are non-commutating diodes and adopt slow-recovery or fast-recovery diodes.

10. The medium voltage variable frequency driving system of claim 4, wherein each of the three single-phase rectification circuits respectively comprises:
    a first diode, an anode of the first diode is coupled to the single-phase voltage input;
    a second diode, an anode of the second diode is coupled to the midpoint;
    a third diode, a cathode of the third diode is coupled to the first output terminal;
    a fourth diode, a cathode of the fourth diode is coupled to the single-phase voltage input;
    a fifth diode, a cathode of the fifth diode is coupled to the midpoint;
    a sixth diode, an anode of the sixth diode is coupled to the second output terminal;
    a switch, a first terminal of the switch is coupled between the cathode of the first diode, a cathode of the second diode and an anode of the third diode, and a second terminal of the switch is coupled between an anode of the fourth diode, an anode of the fifth diode and a cathode of the sixth diode.

11. The medium voltage variable frequency driving system of claim 10, wherein the third diode and the sixth diode are commutating diodes and adopt fast-recovery diodes, and the first diode, the second diode, the fourth diode and the fifth diode are non-commutating diodes and adopt slow-recovery or fast-recovery diodes.

12. The medium voltage variable frequency driving system of claim 4, wherein each of the three single-phase rectification circuits respectively comprises:
    a first switch, a second terminal of the first switch is coupled to the single-phase voltage input;
    a second switch, a first terminal of the second switch is coupled to the single-phase voltage input;
    a first diode, an anode of the first diode is coupled to a first terminal of the first switch, and a cathode of the first diode is coupled to the first output terminal;
    a second diode, an anode of the second diode is coupled to the midpoint, and a cathode of the second diode is coupled to the first terminal of the first switch;
    a third diode, a cathode of the third diode is coupled to a second terminal of the second switch, and an anode of the third diode is coupled to the second output terminal; and
    a fourth diode, an anode of the fourth diode is coupled to the second terminal of the second switch, and a cathode of the fourth diode is coupled to the midpoint.

13. The medium voltage variable frequency driving system of claim 12, wherein the first diode and the third diode are commutating diodes and adopt fast-recovery diodes, and the second diode and the fourth diode are non-commutating diodes and adopt slow-recovery or fast-recovery diodes.

14. The medium voltage variable frequency driving system of claim 2, wherein, in the multilevel inverter, by coupling the first output terminal, the midpoint and the second output terminal with the high-capacity capacitor module, the input from the three-phase electrical grid is converted into a required three-phase alternating current output through the multilevel inverter, so as to drive the induction motor.

15. The medium voltage variable frequency driving system of claim 14, wherein the multilevel inverter is a three-level inverter, and each single-phase three-level inverter at least comprises two switches and a clamping diode, wherein one terminal of the clamping diode is connected with the midpoint of the three-level rectification circuit, and the other terminal of the clamping diode is connected with the two switches.

16. The medium voltage variable frequency driving system of claim 2, wherein the high-capacity capacitor module comprises:
    a first capacitor coupled between the first output terminal and the midpoint; and
    a second capacitor coupled between the midpoint and the second output terminal.

17. The medium voltage variable frequency driving system of claim 1, wherein the alternating current voltage is a pulse-width modulation (PWM) square-wave alternating current signal, and the medium voltage variable frequency driving system further comprises at least one controller coupled with the multilevel inverter and the three-phase switch-mode rectification module, wherein the at least one controller is used for controlling the variable frequency, a pulse width or an amplitude of the pulse-width modulation square-wave alternating current signal, accordingly the controller is used for superimposing the pulse-width modulation square-wave alternating current signal into an alternating current output similar to a sinusoidal wave, so as to drive the induction motor.

18. The medium voltage variable frequency driving system of claim 17, wherein the controller of the medium voltage variable frequency driving system is used for controlling the variable frequency, the pulse width or the amplitude of the pulse-width modulation square-wave alternating current signal at the alternating current side of the rectification module, so as to control the power factor and the total harmonic distortion of the three-phase switch-mode rectification module, further to respectively achieve an appropriate value of the power factor and the total harmonic distortion.

19. The medium voltage variable frequency driving system of claim 18, wherein the controller of the medium voltage variable frequency driving system is a digital microprocessor.

* * * * *